United States Patent [19]

Pinnau et al.

[11] Patent Number: 4,902,422
[45] Date of Patent: Feb. 20, 1990

[54] DEFECT-FREE ULTRAHIGH FLUX ASYMMETRIC MEMBRANES

[75] Inventors: Ingo Pinnau; William J. Koros, both of Austin, Tex.

[73] Assignee: Board Regents The University of Texas System, Austin, Tex.

[21] Appl. No.: 280,708

[22] Filed: Dec. 6, 1988

[51] Int. Cl.$^4$ .............................................. B01D 13/00
[52] U.S. Cl. .......................... 210/500.23; 210/500.29; 210/500.36; 55/16; 264/41
[58] Field of Search ..................... 210/500.40, 500.41, 210/500.42, 490, 651, 650, 500.23, 500.29, 500.36; 264/41; 427/244, 245, 246; 55/16, 158

[56] References Cited

U.S. PATENT DOCUMENTS

| | | | |
|---|---|---|---|
| 3,615,024 | 10/1971 | Michaels | 210/500.4 X |
| 3,709,774 | 1/1973 | Kimura | 161/159 |
| 3,825,506 | 7/1974 | Carter | 260/2.5 L |
| 3,945,926 | 3/1976 | Kesting | 210/500 M |
| 3,951,621 | 4/1976 | Hughes et al. | 55/16 |
| 3,957,651 | 5/1976 | Kesting | 210/490 |
| 4,230,463 | 10/1980 | Henis et al. | 55/16 |
| 4,333,972 | 6/1982 | Kesting | 427/244 |
| 4,450,126 | 5/1984 | Kesting | 264/41 |
| 4,472,175 | 9/1984 | Malon et al. | 55/16 |
| 4,477,598 | 10/1984 | Kesting | 521/62 |
| 4,486,202 | 12/1984 | Malon et al. | 55/158 |
| 4,595,707 | 6/1986 | McCreedy et al. | 521/62 |
| 4,602,922 | 7/1986 | Cabasso et al. | 55/158 |
| 4,606,740 | 8/1986 | Kulprathipanja | 55/16 |
| 4,606,824 | 8/1986 | Chu et al. | 210/635 |
| 4,608,060 | 8/1986 | Kulprathipanja | 55/16 |
| 4,613,440 | 9/1986 | Zupancic et al. | 210/490 |
| 4,627,859 | 12/1986 | Zupancic et al. | 55/158 |
| 4,631,157 | 12/1986 | Johnson | 264/41 |
| 4,655,807 | 4/1987 | Ohmori et al. | 55/522 |
| 4,659,470 | 4/1987 | Caneba et al. | 210/500.21 |
| 4,666,468 | 5/1987 | Wu | 55/16 |
| 4,666,644 | 5/1987 | Watson | 264/41 |
| 4,693,825 | 9/1987 | Trouw | 210/500.28 |
| 4,695,483 | 9/1987 | Zupancic et al. | 427/244 |
| 4,717,395 | 1/1988 | Chiao | 55/16 |
| 4,728,346 | 3/1988 | Murphy | 55/158 |
| 4,746,333 | 5/1988 | Peinemann et al. | 55/158 |

FOREIGN PATENT DOCUMENTS 0257012 2/1988 European Pat. Off. .
3715649 2/1988 Fed. Rep. of Germany .

OTHER PUBLICATIONS

K. V. Peinemann, et al., "Polyethersulfone and Polyetherimide Membranes with High Selectivities for Gas Separation", International Workshop on Membranes for Gas and Vapor Separation, Mar. 7-9, 1988, Quiryat Anavim, Israel.

Jay M. S. Henis, et al., "Composite Hollow fiber Membranes for Gas Separation: The Resistance Model Approach", Journal of Membrane Science, 8 (1981) 233-246.

Primary Examiner—Frank Spear
Attorney, Agent, or Firm—Arnold, White & Durkee

[57] ABSTRACT

Defect-free, ultrahigh flux integrally-skinned asymmetric membranes having extremely thin surface layers (<0.2 μm) comprised of glassy polymers are disclosed. The membranes are formed by casting an appropriate drope followed by forced convective evaporation of solvent to obtain a dry phase separated asymmetrical structure. The structure is then washed in a precipitation liquid and dried.

20 Claims, No Drawings

DEFECT-FREE ULTRAHIGH FLUX ASYMMETRIC MEMBRANES

BACKGROUND OF THE INVENTION

This invention relates to defect-free, ultrahigh flux asymmetric membranes having ultrathin selective layers for separating fluids, especially gases. In another aspect, the invention relates to a novel dry/wet phase separation process for preparing integrally-skinned asymmetric membranes having simultaneously improved productivity and selectivity. In yet another aspect, the invention relates to a process for separating one gas from a gaseous mixture by selective permeation of the gas through an asymmetric membrane with an ultrathin defect-free selective surface layer of less than 0.2 μm comprised of glassy polymers.

A variety of applications in the chemical processing industries, including production of blanketing gases, recovery of components from refinery and chemical synthesis streams and treatment of product gases from enhanced oil recovery operations would benefit from improved gas separation processes. Separating at least one selected gas from a gaseous mixture using processes based on membranes with the capability for selectively permeating one or more gases can provide a product enriched in the one or more desired gases relative to the feed composition. For commercial viability, the membranes in such processes must have adequately high productivity coupled with a sufficiently high selectivity.

Loeb and Sourirajan (hereafter "LS"), in U.S. Pat. No. 3,133,132 disclosed a method for the preparation of cellulose acetate membranes for desalination of water. This patent teaches a method of membrane formation in which a thin layer of cellulose acetate solution is cast on a suitable support followed by solvent evaporation and subsequent quenching in cold water to produce an asymmetric membrane comprised of a thin selective surface layer supported by a microporous substructure.

This asymmetric structure provides extremely high selectivity in reverse osmosis operations because the thin selective layer is capable of discriminating between the water and dissolved salts to almost the same degree as is possible using a much thicker dense film of the same material. The productivities of asymmetric membranes are inversely proportional to the apparent thickness of the thin selective layer. By virtue of its much thinner selective layer, and hence much lower resistance to passage of permeant water, these asymmetric structures also offer tremendously higher productivities.

However, it has been found that asymmetric cellulose acetate membranes have not been used without problems in reverse osmosis applications, i.e., lack of temperature, chemical and microorganism resistance. Therefore attention has been drawn to formation of asymmetric membranes from materials other than cellulose-based polymers to provide stronger structural properties and increased chemical resistance. The development of integrally-skinned asymmetric membranes based on the LS process using these alternate materials has met with significant difficulties in terms of achieving adequate selectivity and high permeation rates.

Typically the noncellulose-based polymer membranes made by the LS process yield structures which have either microporous skins and unacceptably low selectivities or overly thick selective layers which produce unacceptably low productivities. Such asymmetric membranes therefore, have often failed to satisfy requirements in liquid separation operations such as reverse osmosis.

More recently attempts to produce membranes for use in gas separations have been emphasized. Attempts have been made to draw on knowledge developed in the liquid-liquid separation membrane field. An additional problem that arises in utilizing LS membranes quenched in aqueous nonsolvents for gas separation applications is their tendency to collapse upon drying the subtle morphology needed to produce selectivity and productivity. This problem has been overcome by solvent exchange techniques to control the interfacial tension acting in the porous structure. However, current solvent exchange techniques are multistep processes, making the overall, conventional LS asymmetric membrane preparation procedure rather complicated and expensive. The LS technique, even when combined with modified casting protocols has proved to be only marginally acceptable for the more demanding requirements of perfection of the selective skin in the gas separation case.

Permeation occurs by a so-called solution/diffusion mechanism and pore flow through the defects of the skin layer. The solution-diffusion mechanism involves interaction of the gas in the external feed stream with the upstream membrane face to produce a concentration gradient across the selective skin to drive the permeation process.

While the presence of some small pores in the membrane can be tolerated in liquid separations such as desalination, the exceedingly small dimensions of gas molecules in gas separation systems, means that pores even as small as 5Å cause unacceptable losses in selectivity if present at more than a few ppm in area fraction (H. M. S. Henis, M. K. Tripodi, "Composite Hollow Fiber Membranes For Gas Separations: The Resistance Model Approach" J. of Membr. Sc. 8,233–246 (1981).) Therefore, separation is significantly affected by the size and number of defects in the skin layer of asymmetric membranes. Methods of post-treatment to eliminate surface defects of asymmetric membranes include annealing and gas, vapor or solvent treatments. However, the membrane productivity usually is decreased by these treatments (see for example U.S. Pat. Nos. 4,486,202 and 4,472,175).

The low selectivities caused by the presence of defects in gas separation membranes was also addressed by an earlier coating technique introduced by Henis and Tripodi, U.S. Pat. No. 4,230,463. The multi-component membrane produced by this coating process typically comprises a silicone rubber coating on an asymmetric membrane made of a glassy polymer. Such multicomponent membranes allow fabrication from a wide variety of materials. The asymmetric membranes used in this embodiment were spun from solvent, or solvent/nonsolvent dopes of glassy polymers, especially aromatic polysulfone, and coagulated in water. Typically, selective layers on these membranes were on the order to 1500 to 2500Å. Elimination of Knudsen and viscous flow through defects in the selective layer using this technique resulted in significant improvements in selectivity at a cost of productivity. The productivity is determined by the series diffusional resistance contributed by the rubber coating and the selective glassy polymer layer. A tradeoff between productivity and selectivity, therefore, is inevitable in applying this approach.

To make membrane-based gas separation useful in industrial applications, a skin thickness of less than 0.2 microns is generally required. Two casting variables favor the formation of essentially defect-free membranes made by conventional casting procedures: First, the polymer concentration at the nascent membrane/coagulant interface should be as high as possible. Therefore casting dopes usually contain 20 to 30% polymer. A further approach to increase the polymer concentration is to partially evaporate the solvent of the casting dope. Second, a relatively dense skin layer can be obtained by controlled (slow) precipitation. Although both approaches usually lead to essentially defect-free gas separation membranes, the resulting selective layer thickness is commonly in the order of 0.1 to 6.0 micron (U.S. Pat. No. 4,666,644). Thus, permeation rates of most conventional integral-asymmetric membranes are relatively low.

Several approaches for producing high productivity membranes from selected polymers (polyethersulfone and polyetherimide) having selectivities close to those of the intrinsic selectivities of these glassy polymers have been described in U.S. Pat. No. 4,746,333 and German Patent No. DE 3420373 C2. These techniques, however, involve either modifications of the precipitation liquid to include a polymeric blocking agent or a subsequent post-treatment to repair defects associated with the formation of very thin selective layers on the order of 500Å to 2000Å (U.S. Pat. No. 4,746,333 and German Patent Application No. P 3615649.3-44.).

Kesting et al. (EPA No. 0257012 A2) have proposed a concept based on formation of a graded density skin to produce high productivity membranes by incorporation of high levels of frozen free volume in the selective layer of asymmetric membranes used in gas separation. It is claimed that the increase in free volume of the membrane skin is indicated by an increase of the glass transition temperature of the membrane sample compared to that of the bulk polymer. The membranes are formed by immersion in water of a casting solution comprised of a Lewis-acid-base complex solvent system close to the point of incipient gelation. Without using the coating technique of Henis and Tripodi cited above, these membranes have unacceptably low selectivities due to their much higher surface porosities which accompany their apparently thinner skins. Upon coating, these membranes show significant increases in selectivity with small reductions in productivity. As opposed to the membranes described by Henis and Tripodi, the new membrane structure is more productive; however, it represents a step backward in terms of generation of a truly defect free glassy polymer surface layer.

SUMMARY OF THE INVENTION

The present invention provides defect-free, ultrahigh flux integrally-skinned asymmetric membranes having extremely thin surface layers (<0.2 $\mu$m) comprised of glassy polymers. The membranes are prepared by a novel dry/wet phase separation process. The membranes are effective for separating fluids, especially gases with significant increases in productivity and/or greater separation selectivity as compared to currently used membranes made of the same materials.

The invention demonstrates the ability to prepare efficient, defect-free asymmetric membranes with extremely high productivities, at essentially intrinsic separation factors. The thin selective layer is supported by a very open microporous substructure containing voids, and in some cases macrovoids as evidenced by scanning electron microscopy. The invention is not limited to a specific polymer, solvent or nonsolvent system for making the membranes.

In the dry/wet phase separation process, membranes are cast from multicomponent casting solutions containing 10-50% polymer, solvents, and nonsolvents with various degrees of solvating power. The composition of the casting solution is chosen such that it is very close to the point of phase separation/ Dry phase separation is induced prior to immersion by partial convective evaporative removal of solvent/nonsolvent components from the nascent membrane. Immersion in an appropriate nonsolvent precipitation liquid produces an ultrathin selective layer. Convective removal of the solvent/nonsolvent components ensures a defect-free selective layer of <0.2 $\mu$m using the types of dope formulations specified in this invention. Non-convective evaporative removal of the solvent/nonsolvent components may produce ultramicroporous defects in the surface layer. These defects can be eliminated by various post-treatments.

DETAILED DESCRIPTION OF THE PREFERRED EMBODIMENTS

This invention comprises a method to produce defect-free integrally-skinned asymmetric membranes. The defect-free selective layers of these membranes are significantly thinner than those of state-of-the-art membranes. The present invention includes structures with defect-free selective layers as thin as 200-300Å and as thick as 2000Å. An advantage of the invention is the excellent reproducibility of the thin selective layer that can be produced when the correct protocols are followed. Moreover, these membranes can be used without post-treatments of any kind, thereby simplifying their production. Post treatments, on the other hand, may be desirable in some cases to protect the thin selective layer. The membranes can be formed from commercially available glassy polymers such as polysulfone, polycarbonate, etc. However, the process also applies to polymers with tailored permeation properties made specifically for gas separation applications such as substituted polycarbonates, polysulfones, polyimides, etc.

Due to the required perfection of the selective layer necessary in gas separation processes, gas separation membranes are, in principle, also applicable to the separation of liquids. Usually, however, the productivity of gas separation membranes is too low for liquid separation applications, due primarily to the thick selective layers needed to guarantee the absence of defects. The present membranes, on the other hand, offer the potential for use in liquid separations as well, since their ultrathin selective layers can provide productivities as much as an order of magnitude above typical gas separation membranes. Alternative materials may be desirable for use in liquid separations; however, the method of the present invention for producing ultrathin selective layers still applies.

The structure of the membrane formed under this invention has a thin selective layer on an open cell microporous support with very little resistance to flow. The apparent thickness of the selective layer can be calculated by taking the ratio of the permeation fluxes and reported permeability coefficients of dense films formed from the same polymers. This apparent thickness is significantly less than is apparent as a skin layer even on extremely high magnification scanning electron micrographs of the membrane cross-section. This suggests that the ultrathin selective layer is itself maintained on a finely porous support layer whose porosity may not be discernible by microscopy but can be easily detected by gas molecules which can sense morphological features on the order of 3–5Å. Beneath the complex morphology noted above lies a highly open porous support, easily seen by scanning electron microscopy, containing a large number of interconnecting voids and in some cases, macrovoids. The structure has good mechanical integrity and is able to withstand protracted exposure to large transmembrane pressure differences.

A unique aspect of the process is the initiation of phase separation prior to immersion. It has been found that the proper choice of dope formulation, coupled with convective removal of solvent/nonsolvent components from the cast nascent membrane ensures a defect free, ultrathin ($<0.2\mu$) selective layer on a microporous support. It has also been found that by using the dry/wet phase separation process without convective removal of solvent/nonsolvent components yields extremely thin selective layers which in some cases may contain tiny defects. These defects can be healed by post treatments which maintain the essential integrity of the ultrathin skin, thereby demonstrating that the ultrathin selective layer is a result of the dry/wet phase separation process that has not been previously identified as a critical element in forming such membranes in state-of-the-art membrane casting procedures.

To obtain highly productive defect-free gas separation membranes according to this invention, the proper dope formulation and nascent membrane formation procedures must be followed prior to immersion in a nonsolvent quench bath. Various post-formation procedures can be used in some cases to facilitate drying, to protect the thin selective layer, or to repair damage caused during or after the formation process.

The dope should contain (i) polymer/copolymer or polymer blend, (ii) a solvent system, and (iii) a nonsolvent system. The polymer/copolymer or polymer blend can be chosen from either commercially available glassy polymers or tailored materials with desirable intrinsic gas separation properties. The solvent system must be chosen to both fully dissolve the polymer and to tolerate the presence of the nonsolvent system so that the point of incipient phase separation can be reached while maintaining a dope rheology that is appropriate for casting or spinning the nascent membrane structure. The solvent system must contain at least one component with a higher vapor pressure than any of the components of the nonsolvent system at the temperature of the nascent membrane formation. On the other hand, the nonsolvent system must contain at least one component with a lower vapor pressure than the most volatile component in the solvent system at the temperature of the nascent membrane formation. Additional components in the dope with even lower vapor pressures than the most volatile component may be used to control the transport properties of the nascent membrane. This additional capability allows control of efflux rates of originally present dope components as well as influx rates of precipitating components. Moreover, the additional components allow control of the rheology of the nascent membrane to provide mechanical stability prior to and during the formation process.

Dry phase separation in the outer region of the nascent membrane is induced by the removal of volatile components such that the remaining solution in this thin region becomes thermodynamically unstable. This phenomenon is indicated by the formation of a cloudy region in the nascent membrane between the external gas interface and the essentially stable underlying region of the nascent membrane that has not undergone such dry phase separation. The removal of volatile components to induce the dry phase separation can occur as a result of either free or preferably forced convection from the surface of the nascent membrane.

The use of forced convection to induce the dry phase separation yields remarkably superior membrane reproducibility and defect free selective layers. The gas or vapor used as the convective agent can include any pure or mixed stream with the ability to remove volatile components from the surface of the nascent membrane. In addition to convection by a moving gas stream across a static nascent membrane, this invention includes the embodiment of convective removal of volatile components from the surface of the nascent membrane by movement of the nascent membrane through either a static or moving gas or vapor stream. On the other hand, free convection may require subsequent treatments to produce a defect-free selective layer.

Following the dry phase separation process, the nascent membrane must be immersed in a nonsolvent precipitation liquid to cause phase inversion, thereby producing an integrally-skinned asymmetric membrane with an ultra-thin separating layer. The precipitation liquid can be either aqueous, or organic, inorganic or any mixture of aqueous, organic and inorganic components that are miscible with a sufficient fraction of the remaining dope components in the nascent membrane at the time of immersion to allow their removal into the bath to produce a self-sustaining membrane. The quench may also contain organic or inorganic additives to alter the thermodynamic activity of the quench components, thereby altering the influx rate of the quench components into the nascent membrane.

The selection of the precipitation liquid is important to obtaining acceptable properties in the final asymmetric structure. The precipitation liquid and dope formulation must be selected to complement each other in order to maintain the precursor to the ultrathin selective layer and the finely porous support layer morphology introduced during the dry phase separation while also providing sufficiently rapid precipitation to produce an open cell support with low resistance to gas flow and yet good mechanical integrity. The preferred embodiment of a suitable precipitation liquid should show an absorption level in the neat polymer of less than 50% and preferably less than 30% and even more preferably less than 10%.

After the membranes have been removed from the precipitation bath, washed and dried, gas permeation test data indicate that the specific method used to induce dry phase separation has a strong influence on whether or not post treatments of the dried membranes are needed to achieve defect-free selective layers.

In the absence of forced convection, the resulting membranes have attractive, but not optimum, properties. For long unforced evaporation times with the dry phase separation process, a defect-free membrane usually is obtained but the greater thickness of the selective layer achieved in this case is substantially less attractive than possible by the preferred embodiment of the present invention. On the other hand, with short or no evaporation time, a defect free membrane is usually not obtained; however, thin layers can be obtained. The selectivities of these thin layers can be improved with little or no reduction in productivity by techniques known in the prior art (coating, vapor and liquid solvent treatment, or annealing and the like).

In the preferred embodiment of this invention, forced convection is used to induce dry phase separation by partially removing a fraction of the volatile dope components from the outer region of the nascent membrane. This feature when combined with the other required kinetic, thermodynamic and rheological properties provided by a correctly formulated dope and precipitation liquid yields superior membrane reproducibility and a defect free selective layer of less than 0.2 μm, preferably less than 0.1 μm. The forced convection can be created by many different means. For example, an individual can blow across the surface of the membrane. Alternatively, a dry gas can be blown by mechanical means across the surface or the membrane itself can be moved through the air.

It is not known in the prior art to be able to form thin defect-free membranes using various different polymers as the membrane forming material with a diverse array of casting dopes and precipitation liquids. The present invention comprises a procedure for making membranes that is not limited to a specific polymer, solvent or nonsolvent system for making the membranes. This invention provides flexibility in tailoring the thermodynamic and kinetic factors controlling the desirable ultrathin defect-free membrane structure.

The following examples are for illustrative purposes only and should not limit the scope of the invention. The gas flow for the forced convective drying was generally within the range of 10–20 liters/minute and was distributed from a ¼ inch diameter tube by simply moving it back and forth above the surface of the nascent membrane.

EXAMPLE 1

A casting solution was prepared by dissolving 20 g bisphenol-A polycarbonate in a solvent mixture consisting of 87 g methylene chloride and 33 g 1,1,2 trichloroethane. After complete dissolution of the polymer, 20 g 2-butanol were added to the casting dope as a nonsolvent. The homogenous solution was stirred for 30 minutes and degassed for 1 hour to remove gas bubbles. Membranes were cast on glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 15 seconds, the opaque membranes were immersed into a methanol quench bath at 20° C. and subsequently washed for a period of ten minutes. Thereafter, the membranes were air-dried at 25° C. for 12 hours.

Productivities of the dry, integral-asymmetric polycarbonate membranes were measured with a Millipore test cell (Millipore Corp., Bedford, Mass.) using pure nitrogen, oxygen, and helium, respectively. The effective membrane area was 12.6 cm². Steady-state productivities, as shown in Table 1, were obtained at a pressure difference of 3.4 bar at 25° C. with bubble flow meters.

The apparent thickness of the integral-asymmetric polycarbonate membranes of the present invention are calculated based on an intrinsic oxygen permeability coefficient of $1.5 \times 10^{-10}$ cm³(STP)cm/cm² sec cm Hg as determined for homogeneous polycarbonate films of known thicknesses.

TABLE 1

| Sample | Productivity P/l [cm³(STP)/cm² sec cmHg] × 10⁶ | | | Selectivity | | Apparent Thickness [Å] |
|---|---|---|---|---|---|---|
| | $N_2$ | $O_2$ | He | $O_2/N_2$ | $He/N_2$ | |
| 1 | 4.4 | 25.5 | 254 | 5.8 | 58 | 580 |
| 2 | 5.2 | 27.4 | 278 | 5.3 | 53 | 540 |
| 3 | 3.8 | 17.5 | 169 | 4.6 | 44 | 850 |
| 4 | 3.0 | 14.5 | 143 | 4.8 | 48 | 1030 |
| 5 | 5.4 | 29.0 | — | 5.4 | — | 510 |
| 6 | 4.6 | 26.8 | — | 5.8 | — | 560 |
| Mean | 4.4 | 23.5 | 211 | 5.3 | 51 | 680 |
| Comparative Example U.S. Pat. No. 3,852,388 | 0.06 | 0.27 | — | 4.5 | — | 61,000 |

The integral-asymmetric polycarbonate membranes according the present invention show oxygen/nitrogen selectivities that exceed those of membranes of the prior art according to U.S. Pat. No. 3,852,388 and are essentially equal to the intrinsic selectivity of homogeneous polycarbonate films. Furthermore, productivities are two orders of magnitude higher than those of state-of-the-art polycarbonate membranes as evident from Table 1. Membranes according to U.S. Pat. No. 3,852,388 are made using methylene chloride as the volatile solvent and methanol as the precipitation liquid in a casting procedure that includes unforced evaporation (free convection) for a period of one minute. Although the same volatile solvent and the same precipitation liquid have been chosen for the preparation of the membranes according to the present invention, Example 1 clearly demonstrates the advantages of the inventive concept of dry phase separation prior to the immersion process induced by forced convective flow of a gas stream across the freshly cast membrane surface.

EXAMPLE 2

A casting solution was prepared by dissolving 35 g bisphenol-A polysulfone in a solvent mixture consisting of 130 g methylene chloride and 50 g 1,1,2 trichloroethane. After complete dissolution of the polymer, 30 g 2-butanol were added to the casting dope as a nonsolvent. The homogeneous solution was stirred for 2 hours and degassed for 1 hour to remove gas bubbles. Membranes were cast on glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol quench bath at 20° C. and subsequently washed for a period of ten minutes. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, hydrogen and carbon dioxide, respectively. The effective membrane area was 12.6 cm².

Steady-state productivities, as shown in Table 2, were obtained at a pressure difference of 3.4 bar at 25° C. with bubble flow meters. The apparent thicknesses of the integral-asymmetric polysulfone membranes of the present invention are calculated based on an intrinsic hydrogen permeability coefficient of $12.0 \times 10^{-10}$ cm$^3$(STP)cm/cm$^2$ sec cm Hg as determined for homogeneous polysulfone films of known thicknesses.

TABLE 2

| Sample | Productivity P/l [cm$^3$(STP)/cm$^2$ sec cmHg] × 10$^6$ | | | Selectivity | | | Apparent Thickness [Å] |
|---|---|---|---|---|---|---|---|
| | O$_2$ | CO$_2$ | H$_2$ | O$_2$/N$_2$ | H$_2$/N$_2$ | CO$_2$/N$_2$ | |
| 1 | 31.3 | 185 | 332 | 5.9 | 62 | 35 | 360 |
| 2 | 26.0 | 150 | 286 | 5.9 | 65 | 34 | 420 |
| 3 | 31.2 | 179 | 352 | 6.1 | 69 | 35 | 340 |
| 4 | 30.8 | 177 | 335 | 5.9 | 64 | 34 | 360 |
| 5 | 18.2 | 88 | 202 | 6.1 | 67 | 29 | 590 |
| 6 | 30.3 | — | 374 | 5.9 | 73 | — | 320 |
| Mean | 28.0 | 155.8 | 314 | 6.0 | 67 | 33 | 400 |
| Comparative Example U.S. Pat. No. 4,666,644* | 0.02 | — | — | 3.9 | — | — | 49,000 |

*The '644 membrane was made from polyhexen sulfone resin.

The integral-asymmetric polysulfone membranes according to the present invention show oxygen/nitrogen selectivities that exceed those of membranes of the prior art according to U.S. Pat. No. 4,666,644 and are essentially equal to the intrinsic selectively of homogeneous polysulfone films. Furthermore, productivities 2–3 orders of magnitude higher than those of state-of-the-art polysulfone-based membranes are evident from Table 2. Membranes according to U.S. Pat. No. 4,666,644 are based on modified polysulfone materials that show 5 to 70 times higher intrinsic oxygen permeability coefficients than bisphenol-A based polysulfone used in the present invention as an illustrative example, so the higher productivities of the present membranes are even more impressive.

However, polysulfone membranes made according to the current invention are 50 to 100 times thinner and thus result in substantially increased oxygen productivity compared to the membranes made by the teachings of U.S. Pat. No. 4,666,644. Furthermore, U.S. Pat. No. 4,666,644 is based on a free convective evaporation process, as already described in Example 1 for asymmetric polycarbonate membranes in U.S. Pat. No. 3,852,388 that leads to defect-free, but rather thick selective layers.

Comparative Example 1: (not according to the invention)

Membranes were cast on glass plates with the casting solution described in Example 2 at 25° C. by means of a Gardner knife with a film thickness of 250 micron. After a free convection period of 5, 15 and 30 seconds, respectively, the membranes were immersed into a methanol quench bath at 20° C. and subsequently washed for a period of thirty minutes. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen and oxygen, respectively. The effective membrane area was 12.6 cm-cm$^2$. Steady-state productivities, as shown in Table 3, were obtained at a pressure difference of 3.4 bar at 25° C. with bubble flow meters.

The apparent thicknesses of the integral-asymmetric polysulfone membranes are calculated based on an intrinsic oxygen permeability coefficient of $1.1 \times 10^{-10}$ cm$^3$(STP)cm/cm$^2$ sec cm Hg as determined for homogeneous polysulfone films of known thicknesses. Clearly, for the membranes prepared without forced convection, less desirable properties result.

TABLE 3

| forced convective evaporation | free convective evaporation | Sample | Productivity P/l [cm$^3$(STP)/cm$^2$ sec cmHg] × 10$^6$ | | Selectivity O$_2$/N$_2$ | Apparent Thickness [Å] |
|---|---|---|---|---|---|---|
| | | | N$_2$ | O$_2$ | | |
| None | 5 seconds | 1 | 267 | 259 | 0.97 | —* |
| None | 5 seconds | 2 | 259 | 273 | 1.05 | —* |
| None | 5 seconds | 3 | 686 | 700 | 1.02 | —* |
| None | 15 seconds | 1 | 427 | 410 | 0.96 | —* |
| None | 15 seconds | 2 | 564 | 554 | 0.98 | —* |
| None | 15 seconds | 3 | 227 | 238 | 1.05 | —* |
| None | 30 seconds | 1 | 0.58 | 3.0 | 5.2 | 3700 |
| None | 30 seconds | 2 | 0.59 | 3.4 | 5.8 | 3200 |
| None | 30 seconds | 3 | 0.63 | 3.8 | 6.0 | 2900 |
| Example 2 5 seconds | 10 seconds | Mean | 4.67 | 28.0 | 6.0 | 400 |

*Thickness cannot be determined based on intrinsic oxygen permeability coefficient, because productivity is mainly determined by pore flow

EXAMPLE 3

A casting solution prepared by dissolving 30 g bisphenol-A polysulfone in a solvent mixture consisting of 130 g methylene chloride and 50 g 1,1,2 trichloroethane. After complete dissolution of the polymer, 30 g 1-propanol were added to the casting dope as a nonsolvent. The homogeneous solution was stirred for 2 hours and degassed to remove gas bubbles. Membranes were cast on glass plates at 25° C. by means of a Gardner knife with a knife gap of 200 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol bath at 20° C. for 12 hours and post-dried in an oven at 80° C. for 2 hours.

Productivity of the dry, integral-asymmetric polysulfone membranes was measured with a Millipore test cell using pure nitrogen and oxygen. The effective membrane area was 12.6 cm$^2$. Steady-state productivities, as shown in Table 4, were obtained at a pressure difference of 3.4 bar at 25° C. with bubble flow meters. The apparent thicknesses of the integral-asymmetric polysulfone membranes were calculated based on an intrinsic oxygen permeability coefficient of $1.1 \times 10^{-10}$ cm$^3$(STP)cm/cm$^2$ sec cm Hg as determined for homogeneous polysulfone films of known thicknesses.

TABLE 4

| Sample | Productivity P/l [cm$^3$(STP)/cm$^2$ sec cmHg] × 10$^6$ | | Selectivity | Apparent Thickness |
|---|---|---|---|---|
| | N$_2$ | O$_2$ | O$_2$/N$_2$ | [Å] |
| 1 | 3.9 | 25.0 | 6.4 | 440 |
| 2 | 5.4 | 33.6 | 6.2 | 330 |
| 3 | 2.2 | 13.6 | 6.2 | 810 |
| 4 | 3.7 | 23.8 | 6.4 | 460 |
| 5 | 3.3 | 17.4 | 5.3 | 630 |
| 6 | 2.7 | 16.7 | 6.2 | 660 |
| Mean | 3.5 | 21.7 | 6.1 | 510 |

EXAMPLE 4

A casting solution was prepared by dissolving 12 g bisphenol-A polysulfone in 60 g 1,2 dichloroethane. After complete dissolution of the polymer, 12 ml n-pentanol were added to the casting dope as a nonsolvent. The homogeneous solution was stirred for 2 hours and degassed to remove gas bubbles. Membranes were cast on glass plates at 25° C. by means of a Gardner knife with a knife gap of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 10 seconds, the opaque membranes were immersed into a methanol bath at 20° C. and subsequently washed for a period of ten minutes. Thereafter the membranes were air-dried at 25° C. for 12 hours and post-dried in an oven at 80° C. for 2 hours.

Productivities of the dry, integral-asymmetric polysulfone membranes were measured with a Millipore test cell using pure nitrogen, oxygen and carbon dioxide, respectively. The effective membrane area was 12.6 cm$^2$. Steady-state productivities were obtained at a pressure difference of 3.4 bar at 25° C. with bubble flow meters. The average productivities and selectivities are reported below:

O$_2$ Productivity: $22.0 \times 10^{-6}$ cm$^3$(STP)/cm$^2$ sec cmHg

CO$_2$ Productivity: $122 \times 10^{-6}$ cm$^3$(STP)/cm$^2$ sec cmHg

O$_2$/N$_2$ selectivity: 5.2

CO$_2$/N$_2$ selectivity: 29

Example 4 shows that the present invention is not limited to the use of specific casting dope compositions as generally required for the preparation of asymmetric gas separation membranes based on the LS process. However, the use of multiple solvent systems, as described in Examples 1 to 3, with solvents having different vapor pressures allows a better control of the inventive concept of dry phase separation of the nascent membrane induced by convective evaporation.

EXAMPLE 5

A casting solution was prepared by dissolving 10 g bisphenol-A polysulfone in a solvent mixture consisting of 43 g chloroform and 17 g 1,1,2 trichloroethane. After complete dissolution of the polymer, 11 g 2-butanol were added to the casting dope as a nonsolvent. The homogeneous solution was stirred for 3 hours and degassed to remove gas bubbles. Membranes were cast on glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol bath at 20° C. and subsequently washed for a period of thirty minutes. Thereafter, the membranes were air-dried at 25° C. for 12 hours and post-dried in an oven at 80° C. for 1 hour.

Productivities of the dry, integral-asymmetric polysulfone membranes were measured with a Millipore test cell using pure nitrogen, oxygen and hydrogen, respectively. The effective membrane area was 12.6 cm$^2$. Steady-state productivities, as shown in Table 5, were obtained at a pressure difference of 3.4 bar at 25° C. with bubble flow meters. The apparent thicknesses of the integral-asymmetric polysulfone membranes were calculated based on an intrinsic hydrogen permeability coefficient of $12.0 \times 10^{-10}$ cm$^3$(STP)cm/cm$^2$ sec cm Hg as determined for homogeneous polysulfone films of known thickness.

TABLE 5

| Sample | Productivity P/l [cm$^3$(STP)/cm$^2$ sec cmHg] × 10$^6$ | | | Selectivity | | Apparent Thickness |
|---|---|---|---|---|---|---|
| | N$_2$ | O$_2$ | H$_2$ | O$_2$/N$_2$ | H$_2$/N$_2$ | [Å] |
| 1 | 4.3 | 27.0 | 329 | 6.3 | 77 | 365 |
| 2 | 6.4 | 39.2 | 476 | 6.1 | 74 | 250 |
| 3 | 5.6 | 35.0 | 449 | 6.3 | 80 | 270 |
| 4 | 2.5 | 14.0 | 163 | 5.6 | 65 | 740 |
| 5 | 5.6 | 32.9 | 399 | 5.9 | 71 | 300 |
| 6 | 4.3 | 27.1 | 343 | 6.3 | 80 | 350 |
| Mean | 4.8 | 29.2 | 360 | 6.1 | 75 | 330 |

Example 5 shows that the present invention is not limited to the specific use of methylene chloride as the most volatile solvent in the casting dope as described in Examples 1 to 3. Membranes prepared with chloroform as the most volatile solvent show the same gas separation performance as those prepared with methylene chloride.

EXAMPLE 6

A casting solution was prepared by dissolving 10 g bisphenol-A polysulfone in a solvent mixture consisting of 17 g 1,1,2 trichloroethane and 43 g methylene chloride. After complete dissolution of the polymer, 12g 2-methyl-2-butanol were added to the casting dope as a nonsolvent. The homogeneous solution was stirred for 2 hours and degassed to remove gas bubbles. Membranes were cast on glass plates at 25° C. by means of a Gardner knife with a knife gap of 200 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol bath at 4° C. and subsequently washed for a period of forty minutes. Thereafter the membranes were air-dried at 25° C. for 12 hours and post-dried in an oven at 80° C. for 2 hours.

Productivities of the dry, integral-asymmetric polysulfone membranes were measured with a Millipore test cell using pure nitrogen, oxygen and carbon dioxide, respectively. The effective membrane area was 12.6 cm$^2$. Steady-state productivities were obtained at a pressure difference of 3.4 bar at 25° C. with bubble flow meters. The average productivities and selectivities of three membrane samples tested are reported below:

$O_2$ Productivity: $31.5 \times 10^{-6} cm^3(STP)/cm^2$ sec cm Hg $CO_2$ Productivity: $180 \times 10^{-6} cm^3(STP)/cm^2$ sec cm Hg $O_2/N_2$ selectivity: 5.9

$CO_2/N_2$ selectivity: 34

LS-casting procedures generally favor the immersion of the nascent membranes in cold precipitation liquid, i.e. less than 10° C, which results in less defective skin layers. Example 6 illustrates relatively low sensitivity of the current invention to the temperature of the precipitation liquid. The ability to precipitate at room temperature in the current invention for membranes prepared according to the present invention decreases the membrane production costs significantly and represents a significant advantage of the new process.

EXAMPLE 7

A casting solution was prepared by dissolving 30 g bisphenol-A polycarbonate in a solvent mixture consisting of 125 g methylene chloride and 55 g 1,1,2 trichloroethane. After complete dissolution of the polymer, 35 g 2-methyl-2-butanol were added to the casting dope as a nonsolvent. The homogeneous solution was stirred for 1 hour and degassed to remove gas bubbles. Membranes were cast on glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing period. After a free convection period of 10 seconds, the opaque membranes were immersed into a methanol bath at 20° C. and subsequently washed for a period of thirty minutes. Thereafter, the membranes were air-dried at 25° C. for 12 hours and post-dried in an oven at 80° C. for 2 hours.

Productivities of the dry, integral-asymmetric polycarbonate membranes were measured with a Millipore test cell using pure nitrogen, oxygen, hydrogen and carbon dioxide, respectively. The effective membrane area was 12.6 cm$^2$. Steady-state productivities, as shown in Table 6, were obtained at a pressure difference of 3.4 bar at 25° C. with bubble flow meters. The apparent thicknesses of the integral-asymmetric polycarbonate membranes were calculated based on an intrinsic oxygen permeability coefficient of $1.5 \times 10^{-10} cm^3(STP)cm/cm^2$ sec cm Hg as determined for homogeneous polycarbonate films of known thickness.

TABLE 6

| Sample | Productivity P/l [cm$^3$(STP)/cm$^2$ sec cmHg] × 10$^6$ | | | Selectivity | | | Apparent Thickness [Å] |
|---|---|---|---|---|---|---|---|
| | CO$_2$ | O$_2$ | H$_2$ | O$_2$/N$_2$ | H$_2$/N$_2$ | CO$_2$/N$_2$ | |
| 1 | 222 | 51.3 | 424 | 5.5 | 45 | 24 | 290 |
| 2 | 300 | 68.5 | 568 | 5.0 | 42 | 22 | 220 |
| 3 | 232 | 50.4 | 430 | 5.5 | 47 | 25 | 300 |
| 4 | 290 | 70.3 | 545 | 5.0 | 39 | 21 | 210 |
| 5 | — | 38.0 | 300 | 4.6 | 37 | — | 390 |
| 6 | — | 32.1 | 274 | 5.2 | 44 | — | 470 |

Example 7 shows that integral-asymmetric polycarbonate membranes can further be optimized compared to those reported in Example 1 by proper modification of the casting dope.

Comparative Example 2

Integral-asymmetric membranes as taught by the Loeb-Sourirajan casting procedure were compared with the casting dope as described in example 7. No forced convective evaporation was applied during the membrane formation process. After a free convection period of 5, 15, 30, 60 and 120 seconds, respectively, the membranes were immersed into a methanol bath at 20° C. and subsequently washed for a period of twenty minutes. Thereafter, the membranes were air-dried at 25° C. for 12 hours and post-dried in an oven at 80° C. for 2 hours.

Productivities of the dry, integral-asymmetric polycarbonate membranes were measured with a Millipore test cell using pure nitrogen and oxygen. The effective membrane area was 12.6 cm$^2$. Steady-state productivities, as shown in Table 7, were obtained at a pressure difference of 3.4 bar at 25° C. with bubble flow meters.

TABLE 7

| Free Convective Evaporation [sec] | Productivity P/l [cm$^3$(STP)/cm$^2$ sec cmHg] × 10$^6$ | | Selectivity | Apparent Thickness [Å] |
|---|---|---|---|---|
| | N$_2$ | O$_2$ | O$_2$/N$_2$ | |
| 5 | 834 | 780 | 0.94 | —* |
| 5 | 1030 | 979 | 0.95 | —* |
| 5 | 1756 | 1630 | 0.93 | —* |
| 15 | 642 | 606 | 0.94 | —* |
| 15 | 355 | 340 | 0.96 | —* |
| 30 | 214 | 238 | 1.10 | —* |
| 30 | 1311 | 1263 | 0.96 | —* |
| 60 | 23.1 | 61.1 | 2.60 | —* |
| 60 | 26.9 | 59.5 | 2.20 | —* |
| 60 | 31.6 | 67.2 | 2.10 | —* |
| 120 | 4.20 | 16.0 | 3.80 | —* |
| 120 | 1.50 | 4.8 | 3.20 | —* |
| 120 | 1.20 | 4.3 | 3.60 | —* |

*Apparent thickness cannot be determined, because permeation is mainly determined by pore flow Comparative Example 2 demonstrates that asymmetric polycarbonate membranes prepared by teachings of the prior art are hardly useful as gas separation membranes as evident from Table 7. Membranes prepared with 5 to 30 seconds of unforced, free-convective evaporation show only O$_2$/N$_2$ selectivities of less than 1. The low selectivity of these asymmetric membranes is due to defects in the skin layer, so that gas permeation is determined by pore flow according to Knudsen permeation mechanism.

Furthermore, membranes that were prepared with a prolonged evaporation period of 60 to 120 seconds are still defective and their potential as gas separation membranes is therefore rather limited. However, polycarbonate membranes prepared with the same casting dope, but with the inventive concept of dry phase separation prior to immersion induced by forced convection as described in Example 7 are not only defect-free, but show productivities that are substantially higher than state-of-the-art polycarbonate membranes.

EXAMPLE 8

Permeation properties of polycarbonate (Example 7) and polysulfone (Example 2) membranes were investigated at 22° C., 35° C. and 50° C. with pure nitrogen, oxygen and hydrogen, respectively. Table 8 shows that productivities increase significantly with only a slight loss in selectivity as temperature increases.

TABLE 8

| Membrane | Temperature [°C.] | Productivity P/l [cm$^3$(STP)/cm$^2$ sec cmHg] × 10$^6$ | | | Selectivity | |
|---|---|---|---|---|---|---|
| | | $N_2$ | $O_2$ | $H_2$ | $O_2/N_2$ | $H_2/N_2$ |
| poly- | 22 | 5.2 | 26.9 | 236 | 5.2 | 45 |
| carbonate | 35 | 6.6 | 33.7 | 284 | 5.1 | 43 |
| | 50 | 11.60 | 55.8 | 438 | 4.8 | 38 |
| polysulfone | 22 | 4.1 | 24.6 | 284 | 6.0 | 69 |
| | 35 | 5.5 | 30.6 | 358 | 5.6 | 65 |
| | 50 | 7.7 | 41.8 | 457 | 5.4 | 59 |

Examples 9 and 10 demonstrate that the present invention is not limited to the use of bisphenol-A polysulfone and polycarbonate, but can also successfully be applied to prepare defect-free, ultrahigh productivity membranes made of substituted polycarbonates.

EXAMPLE 9

A casting solution was prepared by dissolving 6 g tetramethylpolycarbonate in a solvent mixture consisting of 12.5 g 1,1,2 trichloroethane and 12.5 g methylene chloride. After complete dissolution of the polymer, 11 g 2-methyl-2-butanol and 0.5 g acetic acid were added to the casting dope as nonsolvents. The homogeneous solution was stirred for 2 hours and degassed to remove gas bubbles. Membranes were cast on glass plates at 25° C. by means of a Gardner knife with a knife gap of 200 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 20 seconds, the opaque membranes were immersed into a methanol bath at 20° C. and subsequently washed for a period of thirty minutes. Thereafter, the membranes were air-dried at 25° C. for 12 hours and post-dried in an oven at 80° C. for 2 hours.

Productivities of the dry, integral-asymmetric tetramethylpolycarbonate membranes were measured with a Millipore test cell using pure nitrogen, oxygen, helium, hydrogen and carbon dioxide. The effective membrane area was 12.6 cm$^2$. Steady-state productivities, as shown in Table 9, were obtained at a pressure difference of 3.4 bar at 25° C. with bubble flow meters. The apparent thicknesses of the integral-asymmetric tetramethyl-polycarbonate membranes were calculated based on an intrinsic oxygen permeability coefficient of $5.6 \times 10^{-10}$ cm$^3$(STP)cm/cm$^2$ sec cm Hg as determined for homogeneous tetramethyl-polycarbonate films of known thickness.

TABLE 9

| | Productivity P/l [cm$^3$(STP)/cm$^2$ sec cmHg] × 10$^6$ | | | | Selectivity | | | | Apparent Thickness |
|---|---|---|---|---|---|---|---|---|---|
| Sample | $O_2$ | He | $H_2$ | $CO_2$ | $O_2/N_2$ | $H_2/N_2$ | He/$N_2$ | $CO_2/N_2$ | [Å] |
| 1 | 74.6 | 584 | 673 | — | 5.0 | 45 | 39 | — | 750 |
| 2 | 63.8 | 499 | 584 | — | 4.7 | 43 | 37 | — | 880 |
| 3 | 66.6 | 538 | 619 | — | 5.0 | 47 | 41 | — | 840 |
| 4 | 30.0 | 236 | 277 | 145 | 5.3 | 49 | 41 | 25 | 1870 |
| 5 | 74.6 | 580 | 667 | — | 5.0 | 45 | 39 | — | 750 |

EXAMPLE 10

A casting solution was prepared by dissolving 6 g polyhexafluoropolycarbonate in a solvent mixture consisting of 12.0 g 1,1,2 trichloroethane and 24.0 g methylene chloride. After complete dissolution of the polymer, 6 g 2-methyl-2-butanol were added to the casting dope as a nonsolvent. The homogeneous solution was stirred for 2 hours and degassed to remove gas bubbles. Membranes were cast on glass plates at 25° C. by means of a Gardner knife with a knife gap of 200 micron. Immediately after casting the membranes, a water vapor saturated air stream was blown across the membrane surface for a period of 10 seconds. The initially slightly cloudy nascent membrane turned opaque instantaneously during the onset of the blowing process. After a free convection period of 15 seconds, the opaque membranes were immersed into a methanol bath at 20° C. and subsequently washed for a period of forty minutes. Thereafter, the membranes were air-dried at 25° C. for 12 hours and post-dried in an oven at 80° C. for 2 hours.

Productivities of the dry, integral-asymmetric polyhexafluorocarbonate membranes were measured with a Millipore test cell using pure nitrogen, oxygen, helium, methane and carbon dioxide. The effective membrane area was 12.6 cm$^2$. Steady-state productivities, as shown in Table 10, were obtained at a pressure difference of 3.4 bar at 25° C. with bubble flow meters. The apparent thicknesses of the integral-asymmetric polyhexafluorocarbonate membranes were calculated based on an intrinsic oxygen permeability coefficient of $6.9 \times 10^{-10}$ cm$^3$(STP)cm/cm$^2$ sec cm Hg as determined for homogeneous polyhexafluorocarbonate films of known thickness.

TABLE 10

| Sample | Productivity P/l [cm³(STP)/cm² sec cmHg] × 10⁶ | | | | Selectivity | | | Apparent Thickness [Å] |
|---|---|---|---|---|---|---|---|---|
| | $O_2$ | He | $CH_4$ | $CO_2$ | $O_2/N_2$ | $He/N_2$ | $CO_2/CH_4$ | |
| 1 | 72.0 | 790 | — | 440 | 4.5 | 49 | — | 960 |
| 2 | 67.0 | — | 12.0 | 370 | 4.5 | 49 | 31 | 1030 |

Examples 11 to 14 underline that the present invention is not limited to any kind of specific polymer or casting dope. Membranes reported in the examples described below were made of a highly rigid polyimide that shows drastically different solubility properties compared to those of polycarbonates, substituted polycarbonate and polysulfone. Asymmetric polyimide membranes prepared according to the present invention show extremely promising gas separation performance, since selectivities equal or exceed those of state-of-the-art gas separation membranes at substantially higher productivities.

EXAMPLE 11

A casting solution was prepared by dissolving 10 g Polyimide (hexafluorodianhydride-isopropylidienedianiline) (6FDA-IPDA) in a solvent mixture consisting of 10.0 g 1,1,2 trichloroethane and 20.0 g methylene chloride. After complete dissolution of the polymer, 25 g 1,1,1 trichloroethane and 20 g 2-methyl-2-butanol were added to the casting dope as nonsolvents. The homogeneous solution was stirred for 2 hours and degassed to remove gas bubbles. Membranes were cast on Teflon coated glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol bath at 20° C. and subsequently washed for a period of 2 hours. Thereafter, the membranes were air-dried at 25° C. for 12 hours and post-dried in an oven at 80° C. for 1 hour.

Productivities of the dry, integral-asymmetric 6-FDA-IPDA membranes were measured with a Millipore test cell using pure nitrogen, oxygen, helium and carbon dioxide, respectively. The effective membrane area was 12.6 cm². Steady-state productivities, as shown in Table 11, were obtained at a pressure difference of 3.4 bar at 25° C. with bubble flow meters. The apparent thicknesses of the integral-asymmetric 6-FDA-IPDA membranes were calculated based on an intrinsic oxygen permeability coefficient of $5.1 \times 10^{-10}$ cm³(STP)cm/cm² sec cm Hg as determined for homogeneous 6-FDA-IPDA films of known thickness.

TABLE 11

| Sample | Productivity P/l [cm³(STP)/cm² sec cmHg] × 10⁶ | | | | Selectivity | | | Apparent Thickness [Å] |
|---|---|---|---|---|---|---|---|---|
| | $O_2$ | He | $N_2$ | $CO_2$ | $O_2/N_2$ | $He/N_2$ | $CO_2/N_2$ | |
| 1 | 165.0 | 1190 | 32.2 | 902 | 5.1 | 37 | 28 | 310 |
| 2 | 65.4 | 559 | 11.9 | 356 | 5.5 | 47 | 30 | 780 |
| 3 | 209.0 | 1449 | 37.3 | 1289 | 5.6 | 39 | 35 | 240 |
| 4 | 219.0 | 1653 | 44.2 | 1040 | 5.0 | 37 | 24 | 230 |
| 5 | 212.0 | 1426 | 41.6 | 1069 | 5.1 | 34 | 26 | 240 |
| Mean | 174.0 | 1255 | 33.4 | 931 | 5.2 | 38 | 28 | 290 |

EXAMPLE 12

A casting solution was prepared by dissolving b 10 g Polyimide (hexafluorodianhydride-isopropylidienedianiline) in a solvent mixture consisting of 22.5 g 1.1.2 trichloroethane and 12.5 g methylene chloride. After complete dissolution of the polymer, 20 g 1,1,1 trichloroethane and 18 g 2-methyl-2butanol were added to the casting dope as nonsolvents. The homogeneous solution was stirred for 2 hours and degassed to remove gas bubbles. Membranes were casted on Teflon coated glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 15 seconds, the opaque membranes were immersed into a methanol bath at 20° C. and subsequently washed for a period of 2 hours. Thereafter, the membranes were air-dried at 25° C. for 12 hours and post-dried in an oven at 80° C. for 2 hours.

Productivities of the dry, integral-asymmetric 6-FDA-IPDA membranes were measured with a Millipore test cell using pure nitrogen, oxygen, hydrogen and carbon dioxide, respectively. The effective membrane area was 12.6 cm². Steady-state productivities, as shown in Table 12, were obtained at a pressure difference of 3.4 bar at 25° C. with bubble flow meters. The apparent thicknesses of the integral-asymmetric 6-FDA-IPDA membranes were calculated based on an intrinsic oxygen permeability coefficient of $5.1 \times 10^{-10}$ cm³(STP)cm/cm²sec cm Hg as determined for homogenous 6-FDA-IPDA films of known thickness.

TABLE 12

| Sample | Productivity P/l [cm³(STP)/cm² sec cmHg] × 10⁶ | | | | Selectivity | | | Apparent Thickness [Å] |
|---|---|---|---|---|---|---|---|---|
| | $O_2$ | $H_2$ | $N_2$ | $CO_2$ | $O_2/N_2$ | $H_2/N_2$ | $CO_2/N_2$ | |
| 1 | 60.7 | 512 | 10.2 | — | 6.0 | 50 | — | 840 |
| 2 | 50.7 | 426 | 10.3 | — | 4.9 | 41 | — | 1010 |
| 3 | 117.0 | 996 | 21.0 | 673 | 5.6 | 47 | 32 | 440 |
| 4 | 66.7 | 519 | 12.0 | 387 | 5.5 | 43 | 32 | 760 |
| 5 | 116.0 | 866 | 22.8 | 557 | 5.1 | 38 | 24 | 440 |
| Mean | 82.1 | 663 | 15.3 | 539 | 5.4 | 43 | 29 | 620 |

EXAMPLE 13

A casting solution was prepared by dissolving 10 g Polyimide (hexafluorodianhydride-isopropylidienedianiline) in a solvent mixture consisting of 20.0 g 1,1,2 trichloroethane and 14.0 g methylene chloride. After complete dissolution of the polymer, 20 g 1,1,1 trichloroethane and 20 g 2-methyl-2-butanol were added to the casting dope as nonsolvents. The homogeneous solution was stirred for 2 hours and degassed to remove gas bubbles. Membranes were cast on Teflon coated glass plates at 25° C. by means of a Gardner knife with a knife gap of 250 micron. Immediately after casting the membranes, a water vapor saturated air stream was blown across the membrane surface for a period of 5 seconds. The initially clear, thermodynamically stable nascent membrane turned opaque instantaneously during the onset of the blowing process. After a free convection period of 10 seconds, the opaque membranes were immersed into a methanol bath at 20° C. and subsequently washed for a period of 5 hours. Thereafter, the membranes were air-dried at 25° C. for 12 hours and post-dried in an oven at 80° C. for 2 hours.

Productivities of the dry, integral-asymmetric 6-FDA-IPDA membranes were measured with a Millipore test cell using pure nitrogen, oxygen, helium, carbon dioxide, argon and hydrogen, respectively. The effective membrane area was 12.6 cm². Steady-state productivities, as shown in Table 13, were obtained at a pressure difference of 3.4 bar at 25° C. with bubble flow meters. The apparent thicknesses of the integral-asymmetric 6-FDA-IPDA membranes were calculated based on an intrinsic oxygen permeability coefficient of $5.1 \times 10^{-10}$ cm³(STP)cm/cm² sec cm Hg as determined for homogeneous 6-FDA-IPDA films of known thickness.

EXAMPLE 14

Asymmetric polyimide membranes were prepared according to the method described in Example 12. Productivities of the dry, integral-asymmetric 6-FDA-IPDA membranes were measured with a Millipore test cell using pure methane and carbon dioxide, respectively. The effective membrane area was 12.6 cm². Steady-state productivities were obtained at a pressure difference of 3.4 bar at 25° C. with bubble flow meters. The average results are reported below:

$CH_4$ Productivity: $8.5 \times 10^{-6}$ cm³(STP)/cm² sec cmHg $CO_2$ Productivity: $383 \times 10^{-6}$ cm³(STP)/cm² sec cmHg $CO_2$ $CH_4$ selectivity: 45

Examples 15 to 17 show that the membranes described by the present invention can be precipitated in water. The use of an aqueous precipitation bath is attractive during production because it reduces much of the cost and safety requirements encountered by the use of organic precipitation liquids. Membranes of the present invention precipitated in water show similar gas separation performance as those precipitated in methanol as described in Example 2. Examples 15 to 17 also illustrate the flexibility of the present invention by the use of several nonsolvents in water miscible casting solutions.

EXAMPLE 15

A casting solution was prepared by dissolving 12 g bisphenol-A polysulfone in a solvent mixture consisting of 19 g dimethylacetamide and 19 g tetrahydrofuran. After complete dissolution of the polymer, 9.6 g ethanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in a methanol bath for a period of 1 hour. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm². Steady-state productivi-

TABLE 13

| Sample | Productivity P/l [cm³(STP)/cm² sec cmHg] × 10⁶ | | | | | Selectivity | | | | Apparent Thickness [Å] |
|---|---|---|---|---|---|---|---|---|---|---|
| | Ar | He | $O_2$ | $H_2$ | $CO_2$ | $O_2/N_2$ | He/Ar | $H_2/N_2$ | $CO_2/N_2$ | |
| 1 | 48 | 1595 | 143 | 1426 | 678 | 5.0 | 33 | 50 | 24 | 360 |
| 2 | 54 | 1541 | 151 | 1435 | 885 | 4.9 | 29 | 46 | 28 | 340 |
| 3 | 36 | 1127 | 109 | 1019 | 625 | 6.3 | 31 | 59 | 36 | 470 |
| 4 | 28 | 762 | 84 | 737 | 496 | 6.0 | 27 | 53 | 35 | 610 | ties were obtained at a pressure difference of 3.4 bar at 25° C. with bubble flow meters.

The apparent thicknesses of the integral-asymmetric polysulfone membranes of the present invention are calculated based on an intrinsic hydrogen permeability coefficient of $12.0 \times 10^{-10}$ cm$^3$(STP)cm/cm$^2$ sec cm Hg as determined for homogeneous polysulfone films of known thickness. The average productivities and selectivities are reported below:

$O_2$ Productivity: $24.5 \times 10^{-6}$ cm$^3$(STP)/cm$^2$sec cmHg $H_2$ Productivity: $236.8 \times 10^{-6}$ cm$^3$(STP)/cm$^2$sec cmHg $O_2/N_2$ Selectivity: 5.2

$H_2/N_2$ Selectivity: 50.2

Apparent Thickness [Å]: 500

EXAMPLE 17

A casting solution was prepared by dissolving 12 g bisphenol-A polysulfone in a solvent mixture consisting of 19 g dimethylacetamide and 19 g tetrahydrofuran. After complete dissolution of the polymer, 8.0 g isopropanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in a methanol bath for a period of 1 hour. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm$^2$. Steady-state productivities were obtained at a pressure difference of 3.4 bar at 25° C. with bubble flow meters.

The apparent thicknesses of the integral-asymmetric polysulfone membranes of the present invention are calculated based on an intrinsic hydrogen permeability coefficient of $12.0 \times 10^{-10}$ cm$^3$(STP)cm/cm$^2$ sec cm Hg as determined for homogeneous polysulfone films of known thickness. The average productivities and selectivities are reported below:

$O_2$ Productivity: $20.3 \times 10^{-6}$ cm$^3$(STP)/cm$^2$ sec cmHg $H_2$ Productivity: $224.5 \times 10^{-6}$ cm$^3$(STP)/cm$^2$ sec cmHg $O_2/N_2$ Selectivity: 5.0

$H_2/N_2$ Selectivity: 54.9

Apparent Thickness [Å]: 530

Examples 18 to 20 show that the present invention is not limited to one specific water miscible solvent system. Membranes have been prepared from several nonvolatile solvents, other than dimethylacetamide, and show gas separation performances similar to those prepared from dimethylacetamide as described in example 15.

EXAMPLE 18

A casting solution was prepared by dissolving 12 g bisphenol-A polysulfone in a solvent mixture consisting of 19 g N-methylpyrrolidone ad 19 g tetrahydrofuran. After complete dissolution of the polymer, 8.0 g methanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in a methanol bath for a period of 1 hour. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm$^2$. Steady-state productivities were obtained at a pressure difference at 3.4 bar at 25° C. with bubble flow meters.

The apparent thickness of the integral-asymmetric polysulfone membranes of the present invention are calculated based on an intrinsic hydrogen permeability coefficient of $12.0 \times 10^{-10}$ cm$^3$(STP)cm/cm$^2$ sec cm Hg as determined for homogeneous polysulfone films of known thickness. The average productivities and selectivities are reported below:

$O_2$ Productivity: $29.6 \times 10^{-6}$ cm$^3$(STP)/cm$^2$ sec cmHg $H_2$ Productivity: $354.4 \times 10^{-6}$ cm$^3$(STP)/cm$^2$ sec cmHg $O_2/N_2$ Selectivity: 5.6

$H_2/N_2$ Selectivity: 67.3

Apparent Thickness [Å]: 340

EXAMPLE 19

A casting solution was prepared by dissolving 12 g bisphenol-A polysulfone in a solvent mixture consisting of 19 g diethylformamide and 19 g tetrahydrofuran. After complete dissolution of the polymer, 4.8 g ethanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in a methanol bath for a period of 1 hour. hereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm². Steady-state productivities were obtained at a pressure difference of 3.4 bar at 25° C. with bubble flow meters.

The apparent thicknesses of the integral-asymmetric polysulfone membranes of the present invention are calculated based on an intrinsic hydrogen permeability coefficient of $12.0 \times 10^{-10}$ cm³(STP)cm/cm² sec cm Hg as determined for homogeneous polysulfone films of known thickness. The average productivities and selectivities are reported below:

$O_2$ Productivity: $13.4 \times 10^{-6}$ cm³(STP)/cm² sec cmHg $H_2$ Productivity: $121.5 \times 10^{-6}$ cm³(STP)/cm² sec cmHg $O_2/N_2$ Selectivity: 5.5

$H_2/N_2$ Selectivity: 49.0

Apparent Thickness [Å]: 990

EXAMPLE 20

A casting solution was prepared by dissolving 12 g bisphenol-A polysulfone in a solvent mixture consisting of 19 g dimethyformamide and 19 g tetrahydrofuran. After complete dissolution of the polymer, 7.2 g ethanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 10 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in a methanol bath for a period of 1 hour. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm². Steady-state productivities were obtained at a pressure difference of 3.4 bar at 25° C. with bubble flow meters.

The apparent thicknesses of the integral-asymmetric polysulfone membranes of the present invention are calculated based on an intrinsic hydrogen permeability coefficient of $12.0 \times 10^{-10}$ cm³(STP)cm/cm² sec cm Hg as determined for homogeneous polysulfone films of known thickness. The average productivities and selectivities are reported below:

$O_2$ Productivity: $15.6 \times 10^{-6}$ cm³(STP)/cm² sec cmHg $H_2$ Productivity: $163.4 \times 10^{-6}$ cm³(STP)/cm² sec cmHg $O_2/N_2$ Selectivity: 6.3

$H_2/N_2$ Selectivity: 64.4

Apparent Thickness [Å]: 730

EXAMPLE 21

A casting solution was prepared by dissolving 36 g bisphenol-A polysulfone in a solvent mixture consisting of 57 g dimethylacetamide and 57 g tetrahydrofuran. After complete dissolution of the polymer, 28.8 g ethanol were added to the casting dope as a nonsolvent. The homogeneous solution was stirred for 1 hour and degassed for an additional hour to remove gas bubbles. Membranes were cast on glass plates at 25° C. by means of a Gardner knife with a gap thickness of 250 micron. Immediately after casting the membranes, a water vapor saturated air stream was blown across the membrane surface for a period of 20 seconds. The initially clear, thermodynamically stable nascent membrane turned opaque instantaneously during the onset of the blowing process. After a free convection period of 5 seconds, the opaque membranes were immersed into a water quench bath at 20° C. for a period of 2 minutes and subsequently washed in various baths for a period of 1 hour. In some cases, the membranes were washed in a second bath for a period of 30 minutes. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen respectively. The effective membrane area was 12.6 cm². Steady-state productivities were obtained at a pressure difference of 3.4 bar at 25° C. with bubble flow meters.

The apparent thicknesses of the integral-asymmetric polysulfone membranes of the present invention are calculated based on an intrinsic hydrogen permeability coefficient of $12.0 \times 10^{-10}$ cm³(STP)cm/cm² sec cm Hg as determined for homogeneous polysulfone films of known thickness. The average productivities and selectivities are reported below:

TABLE 14

| Wash | Productivity P/l [cm³(STP)/cm² sec cmHg] × 10⁶ | | | Selectivity | | Apparent Thickness [Å] |
| --- | --- | --- | --- | --- | --- | --- |
| | $N_2$ | $O_2$ | $H_2$ | $O_2/N_2$ | $H_2/N_2$ | |
| water (50° C.) | 3.75 | 19.9 | 249 | 5.3 | 66.4 | 480 |
| methanol | 4.71 | 24.5 | 237 | 5.2 | 50.2 | 500 |
| methanol/hexane | 3.57 | 19.1 | 167 | 5.4 | 46.8 | 720 |
| iPA/hexane | 4.74 | 26.1 | 318 | 5.5 | 67.1 | 380 |

LS gas separation membranes prepared from cellulose acetate are precipitated in water, and must be washed with organic liquids prior to drying in order to preserve the subtle morphology needed to produce selectivity and productivity. Table 14 clearly shows that the type of wash has little effect on the gas separation performance of the asymmetric polysulfone membranes prepared by this invention. Moreover, Table 14 illustrates that organic washes can be entirely eliminated from the preparation process by precipitating and washing the membranes in water, thus reducing production costs and safety requirements.

Comparative Example 3: (not according to the invention)

Membranes were cast on glass plates with the casting solution described in Example 15 at 25° C. by means of a Gardner knife with a gap thickness of 250 micron. After a free convection period of 5, 15, 30, and 45 seconds, respectively, the membranes were immersed into a water quench bath at 20° C. for a period of 2 minutes and subsequently washed in methanol for a period of 1 hour. Thereafter, the membranes were air-dried at 25° C. for 12 hours.

Productivities of the dry, integral-asymmetric polysulfone membranes were measured with a Millipore test cell (Millipore Corp., Bedford, Mass.) using pure nitrogen, oxygen, and hydrogen, respectively. The effective membrane area was 12.6 cm². Steady-state productivities, as shown in Table 15, were obtained at a pressure difference of 3.4 bar at 25° C. with bubble flow meters. The apparent thicknesses of the integral-asymmetric polysulfone membranes are calculated based on an intrinsic oxygen permeability coefficient of $1.1 \times 10^{-10}$ cm³(STP)cm/cm² sec cm Hg as determined for homogeneous polysulfone films of known thickness.

helium were used as the forced convective gas medium, respectively.

Productivities of the dry, integral-asymmetric polysulfone membranes were measured with a Millipore test cell (Millipore corp., Bedford, Mass.) using pure nitrogen and oxygen, respectively. The effective membrane area was 12.6 cm². Steady-state productivities, as shown in Table 16, were obtained at a pressure difference of 3.4 bar at 25° C. with bubble flow meters. The apparent thicknesses of the integral-asymmetric polysulfone membranes of the present invention are calculated based on an intrinsic oxygen permeability coefficient of $1.1 \times 10^{-10}$ cm³(STP)cm/cm² sec cm Hg as determined for homogeneous polysulfone films of known thickness.

TABLE 15

| forced convective evaporation | free convective evaporation | Sample | Productivity P/l [cm³(STP)/cm² sec cmHg] × 10⁶ N₂ | O₂ | Selectivity O₂/N₂ | Apparent Thickness [Å] |
|---|---|---|---|---|---|---|
| None | 5 seconds | 1 | — | — | — | —* |
| None | 5 seconds | 2 | — | — | — | —* |
| None | 5 seconds | 3 | — | — | — | —* |
| None | 15 seconds | 1 | 448 | 470 | 1.05 | —* |
| None | 15 seconds | 2 | 1178 | 1114 | 0.95 | —* |
| None | 15 seconds | 3 | 228 | 261 | 1.14 | —* |
| None | 30 seconds | 1 | 44.2 | 77.3 | 1.74 | —* |
| None | 30 seconds | 2 | 50.0 | 81.2 | 1.62 | —* |
| None | 30 seconds | 3 | 25.4 | 60.1 | 2.37 | —* |
| None | 45 seconds | 1 | 0.35 | 2.2 | 6.3 | 5000 |
| None | 45 seconds | 2 | 0.97 | 6.0 | 6.2 | 1800 |
| None | 45 seconds | 3 | 0.59 | 3.7 | 6.3 | 3000 |
| 10 seconds | 5 seconds | mean | 4.71 | 24.5 | 5.2 | 500 |

*Thickness cannot be determined based on intrinsic oxygen permeability coefficient, because productivity is mainly determined by pore flow

EXAMPLE 22

A casting solution was prepared by dissolving 30 g bisphenol-A polysulfone in a solvent mixture consisting of 130 g methylene chloride and 50 g 1,1,2 trichloroethane. After complete dissolution of the polymer, 36 g 2-methyl-2-butanol were added to the casting dope as a nonsolvent. The homogeneous solution was stirred for 70 hours and degassed for 1 hour to remove gas bubbles. Membranes were cast on glass plates at 25° C. by means of a Gardner knife with a knife gap of 250 micron. Immediately after casting the membranes, a dry air stream was blown across the membrane surface for a period of 5 seconds with a flow rate of 15 liters per minute. The initially clear, thermodynamically stable nascent membrane turned opaque instantaneously during the onset of the blowing process. After a free convection period of 5 seconds, the opaque membranes were immersed into a methanol quench bath at 20° C. and subsequently washed for a period of ten minutes. Thereafter, the membranes were air dried at 35° C. for 12 hours.

Further membranes were cast under the same conditions as described above, except carbon dioxide and

TABLE 16

| forced convective evaporation medium | free convective evaporation | Sample | Productivity P/l [cm³(STP)/cm² sec cmHg] × 10⁶ N₂ | O₂ | Selectivity O₂/N₂ | Apparent Thickness [Å] |
|---|---|---|---|---|---|---|
| dry air | 5 seconds | 1 | 6.2 | 38.9 | 6.3 | 280 |
| dry air | 5 seconds | 2 | 7.2 | 44.5 | 6.2 | 250 |
| dry air | 5 seconds | 3 | 6.7 | 42.5 | 6.3 | 260 |
| dry air | 5 seconds | 4 | 7.2 | 44.4 | 6.1 | 250 |
| CO2 | 5 seconds | 1 | 5.0 | 31.0 | 6.2 | 350 |
| CO2 | 5 seconds | 2 | 5.4 | 33.8 | 6.3 | 330 |
| He | 5 seconds | 1 | 5.4 | 32.5 | 6.0 | 340 |
| He | 5 seconds | 2 | 5.4 | 34.5 | 6.4 | 320 |
| He | 5 seconds | 3 | 5.1 | 32.7 | 6.4 | 340 |
| He | 5 seconds | 4 | 5.3 | 33.4 | 6.3 | 330 |

Examples 22 shows that the forced convective evaporation technique can be carried out with different external gases. The invention is therefore not limited to the use of water vapor saturated air streams as described in Examples 1 to 21.

As can be seen from the foregoing, the present invention provides defect-free ultra high flux asymmetric membranes which are much more efficient than prior art membranes. While the invention has been described by numerous examples of presently preferred embodiments, the scope of the invention is defined by the following claims rather than the foregoing description. Various modifications will be apparent to and can readily be made by those skilled in the art without departing from the scope and spirit of this invention.

What is claimed is:

1. A method for producing integral-asymmetric membranes having a defect-free layer to separate fluid mixtures, said method comprising:

forming a film or a fiber of a polymer solution;

evaporating solvent from said film or fiber by forced convection to obtain a defect-free, phase separated asymmetrical structure;

contacting said defect-free, phase separated asymmetrical structure with a precipitation liquid to obtain a final phase inverted asymmetrical structure by polymer precipitation; and drying said final phase inverted asymmetrical structure to obtain a membrane with an apparent skin thickness of less than about 0.2 micron and a selectivity for separating fluid mixtures greater than 80% of the theoretical value for defect-free films of said polymer.

2. A method according to claim 1 in which the polymer is a homopolymer, heterochain polymer, copolymer or polymer blend selected from the group consisting of polysulfones, polycarbonates, polyesters, polyamides, polyphenylene oxides, polyethersulfones, polyetherimides, polyimides, substituted polyacetylenes, α-substituted polyolefins and modified cellulosics.

3. A method according to claim 1 in which the polymer solution includes a primary solvent selected from the group consisting of halogenated hydrocarbons, ethers and ketones; a secondary solvent selected from the group consisting of halogenated hydrocarbons, aliphatic amides and aliphatic pyrrolidones; and a non-solvent selected from the group consisting of aliphatic and cyclic alcohols, alkyl substituted benzenes, carboxylic acids and halogenated hydrocarbons.

4. A method according to claim 3 in which the primary solvent is selected from the group consisting of methylene chloride, chloroform, 1,2 dichloroethane, acetone and tetrahydrofuran.

5. A method according to claim 3 in which the secondary solvent is selected from the group consisting of 1,1,2 trichloroethane, 1,1,1 trichloroethane, chlorobenzene, dimethylformamide, diethylformamide, gamma-butyrolactone, N-methyl pyrrolidone and dimethyl acetamide.

6. A method according to claim 3 in which the non-solvent is selected from the group consisting of water, methanol, ethanol, 1-propanol, 2-propanol, 1-butanol, 2-butanol, tert. butanol, 1-pentanol, 2-methyl-2-butanol, 1,1,1 trichloroethane, xylene, toluene, benzene, formic acid, acetic acid and propionic acid.

7. A method according to claim 1 in which the precipitation liquid is selected from the group consisting of methanol, ethanol, water, acetone, ethyl acetate and mixtures thereof.

8. A method according to claim 1 in which the polymer solution contains 10 to 50 wt. % of polymer.

9. A method according to claim 1 wherein said forced convection is created by blowing a gas across the surface of said film.

10. An asymmetric membrane produced according to the method of claim 1.

11. An ultrahigh flux asymmetric membrane having an apparent skin thickness of less than about 0.2 micron and a selectivity for separating fluid mixtures greater than 80% of the theoretical value for defect-free films of said polymer, said membrane being prepared by:

forming a film or a fiber of a polymer solution;

evaporating solvent from said film or fiber by forced convection to obtain a defect-free, phase separated asymmetrical structure;

contacting said defect-free, phase separated asymmetrical structure with a precipitation liquid to obtain a final phase inverted asymmetrical structure; and drying said final phase inverted asymmetrical structure to obtain a membrane with an apparent skin thickness of less than about 0.2 micron and a selectivity for separating fluid mixtures greater than 80% of the theoretical value for defect-free films of said polymer.

12. A membrane according to claim 11 in which the polymer is a homopolymer, heterochain polymer, copolymer or polymer blend selected from the group consisting of polysulfones, polycarbonates, polyesters, polyamides, polyphenylene oxides, polyethersulfones, polyetherimides, polyimides, substituted polyacetylenes, α-substituted polyolefins and modified cellulosics.

13. A membrane according to claim 11 in which the polymer solution includes a primary solvent selected from the group consisting of halogenated hydrocarbons, ethers and ketones; a secondary solvent selected from the group consisting of halogenated hydrocarbons, aliphatic amides and aliphatic pyrrolidones; and a non-solvent selected from the group consisting of aliphatic and cyclic alcohols, alkyl substituted benzenes, carboxylic acids and halogenated hydrocarbons.

14. A membrane according to claim 13 in which the primary solvent is selected from the group consisting of methylene chloride, chloroform, 1,2 dichloroethane, acetone and tetrahydrofuran.

15. A membrane according to claim 13 in which the secondary solvent is selected from the group consisting of 1,1,2 trichloroethane, 1,1,1 trichloroethane, chlorobenzene, dimethylformamide, diethylformamide, gamma-butyrolactone, N-methyl pyrrolidone and dimethyl acetamide.

16. A membrane according to claim 13 in which the nonsolvent is selected from the group consisting of water, methanol, ethanol, 1-propanol, 2-propanol, 1-butanol, 2-butanol, tert. butanol, 1-pentanol, 2-methyl-2-butanol, 1,1,1 trichloroethane, xylene, toluene, benzene, formic acid, acetic acid and propionic acid.

17. A membrane according to claim 11 in which the precipitation liquid is selected from the group consisting of methanol, ethanol, water, acetone, ethyl acetate and mixtures thereof.

18. A membrane according to claim 11 in which the polymer solution contains 10 to 50 wt. % of polymer.

19. A membrane according to claim 11 wherein said forced convection is created by blowing a gas across the surface of said film.

20. A method for producing integral-asymmetric membranes having a defect-free layer to separate fluid mixtures, said method comprising:

forming a film or a fiber of a polymer solution, said solution including a primary solvent, a secondary solvent, and a non-solvent;

evaporating solvent from said film or fiber by forced convection to obtain a defect-free, phase separated asymmetrical structure;

contacting said defect-free, phase separated asymmetrical structure with a precipitation liquid to obtain a final phase inverted asymmetrical structure; and drying said final phase inverted asymmetrical structure to obtain a membrane with an apparent skin thickness of less than about 0.2 micron and a selectivity for separating fluid mixtures greater than 80% of the theoretical value for defect-free films of said polymer.

* * * * *